(12) United States Patent
Wodnicki

(10) Patent No.: US 8,961,421 B2
(45) Date of Patent: Feb. 24, 2015

(54) TRANSMIT/RECEIVE CIRCUITRY FOR ULTRASOUND SYSTEMS

(75) Inventor: Robert Gideon Wodnicki, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 1462 days.

(21) Appl. No.: 11/737,414

(22) Filed: Apr. 19, 2007

(65) Prior Publication Data

US 2008/0262357 A1    Oct. 23, 2008

(51) Int. Cl.
*A61B 8/14*    (2006.01)
*G01S 7/52*    (2006.01)

(52) U.S. Cl.
CPC ................ *G01S 7/52017* (2013.01)
USPC ............... 600/459; 307/112; 307/130

(58) Field of Classification Search
USPC ........... 600/459, 446; 307/75, 112, 125, 130; 257/121, 124, 173, 192
See application file for complete search history.

(56) References Cited

U.S. PATENT DOCUMENTS

| 4,817,066 | A |   | 3/1989 | Takasugi et al. |
|---|---|---|---|---|
| 5,105,090 | A | * | 4/1992 | Miyajima et al. ............. 250/551 |
| 5,229,933 | A | * | 7/1993 | Larson, III ..................... 600/459 |
| 5,603,324 | A |   | 2/1997 | Oppelt et al. |
| 6,891,311 | B2 |   | 5/2005 | Phelps et al. |
| 7,314,445 | B2 |   | 1/2008 | Wodnicki et al. |
| 2005/0154300 | A1 |   | 7/2005 | Wodnicki et al. |
| 2007/0016026 | A1 |   | 1/2007 | Thomenius et al. |
| 2007/0079658 | A1 | * | 4/2007 | Wagner ........................... 73/627 |

FOREIGN PATENT DOCUMENTS

| EP | 0430450 | A2 | 6/1995 |
|---|---|---|---|
| EP | 1768101 | A1 | 3/2007 |
| JP | 6321583 | A | 1/1988 |
| JP | 0426416 | A | 1/1992 |
| JP | 1156839 | A | 3/1999 |
| JP | 11290321 | A | 10/1999 |
| JP | 2002369277 | A | 12/2002 |
| JP | 2005193036 | A | 7/2005 |
| JP | 2007089187 | A | 4/2007 |

OTHER PUBLICATIONS

Cicek, Ihsan et al., "Design of a Front-End Integrated Circuit for 3D Acoustic Imaging Using 2D CMUT Arrays", IEEE Transactions on Ultrasonics, Ferroelectrics, and Frequency Control, vol. 52, No. 12, pp. 2235-2241, Dec. 2005.
French Search Report dated Mar. 8, 2011 and Written Opinion.

* cited by examiner

*Primary Examiner* — Unsu Jung
*Assistant Examiner* — Daniel Huntley
(74) *Attorney, Agent, or Firm* — Scott J. Asmus

(57) ABSTRACT

A transceiver for use in an ultrasound system is provided. The transceiver is configured to operate in a transmit mode and a receive mode. The transceiver comprises a high voltage switch, a low voltage switch and a resistor coupled to the high voltage switch and the low voltage switch.

23 Claims, 5 Drawing Sheets

TRANSMIT/RECEIVE CIRCUITRY FOR ULTRASOUND SYSTEMS

STATEMENT REGARDING FEDERALLY SPONSORED RESEARCH & DEVELOPMENT

This invention was made with Government support under contract number 1R01EB002485-01 awarded by National Institute of Health (NIH). The Government has certain rights in the invention.

BACKGROUND

The invention relates generally to ultrasound systems and more specifically to transmit/receive circuitry in ultrasound systems.

An ultrasound imaging system forms an image by acquiring individual ultrasound lines (or beams). Conventional ultrasound imaging systems comprise an array of ultrasonic transducer elements that are used to transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves that combine to form a net ultrasonic wave that travels along a preferred vector direction and is focused in a selected zone along the beam.

The same principles apply when the transducer probe is employed to receive the reflected sound in a receive mode. The voltages produced at the receiving transducer elements are summed so that the net signal is indicative of the ultrasound reflected from a single focal zone in the object. As with the transmission mode, this focused reception of the ultrasonic energy is achieved by imparting separate time delay (and/or phase shifts) and gains to the signal from each receiving transducer element.

The ultrasonic transducer elements are typically located in a hand-held transducer probe that is connected by a flexible cable to an electronics unit that processes the transducer signals and generates ultrasound images. The transducer probe may also carry ultrasound transmit and receive circuitry.

The transmit circuitry usually includes high-voltage components, which are used to drive the individual ultrasonic transducer elements, and low-voltage, high-density digital logic circuitry used to provide transmit signals to the high-voltage drivers. The high-voltage drivers typically operate at voltages of up to approximately ±100 volts, while the low-voltage logic circuitry has an operating voltage on the order of 5 volts in the case of Transistor Transistor Logic (TTL). The high-voltage drivers may be fabricated as discrete components or as integrated circuits, while the low-voltage logic circuitry may be fabricated as a separate integrated circuit or combined with the high-voltage circuitry on a single chip.

In addition to transmit circuitry including the high-voltage drivers and low-voltage logic circuitry, the transducer head may include low-noise, low-voltage analog receive circuitry. The low-voltage receive circuitry, like the transmit logic circuitry, typically has an operating voltage on the order of 5 volts, and may be a separate integrated circuit or may be fabricated with the low-voltage transmit logic circuitry as a monolithic integrated circuit.

The transmit/receive circuitry has two states. In the transmit state, the transmit/receive circuitry connects the output-stage transistors to the ultrasonic transducer element, while isolating the receive circuit from the high-voltage transmit pulse. In the receive state, the transmit/receive circuitry isolates the output-stage transistors from the ultrasonic transducer element and instead connects the receive circuit to the transducer element.

In most ultrasound imaging systems, the transmit/receive circuitry is disposed in the system while the transducer elements are disposed on the ultrasound probe. For greater integration, it is advantageous to dispose the transmitter circuitry and/or the receive circuitry in the probe also. The presence of high voltage components results in larger area required by the transmit/receive circuitry. To accommodate the transmit/receive circuitry into the probe, it is often required to reduce the number of processing channels. However, reducing the number of processing channels will lead to degradation in the image quality.

Therefore, what is needed is low-cost compact transmit/receive circuitry while maintaining image quality.

BRIEF DESCRIPTION

Briefly, according to one embodiment of the invention, a transceiver for use in an ultrasound system is provided. The transceiver is configured to operate in a transmit mode and a receive mode. The transceiver comprises a high voltage switch, a low voltage switch and a resistor coupled to the high voltage switch and the low voltage switch.

In another embodiment, an ultrasound system for imaging objects is provided. The ultrasound system comprises a probe for transmitting and receiving ultrasound signals and an image processor configured to generate an ultrasound image of the object. The probe comprises a plurality of transducers and a plurality of transceivers configured to operate alternately in a transmit mode and a receive mode. Each transceiver switch comprises a high voltage switch, a low voltage switch and a resistor coupled to the high voltage switch and the low voltage switch.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
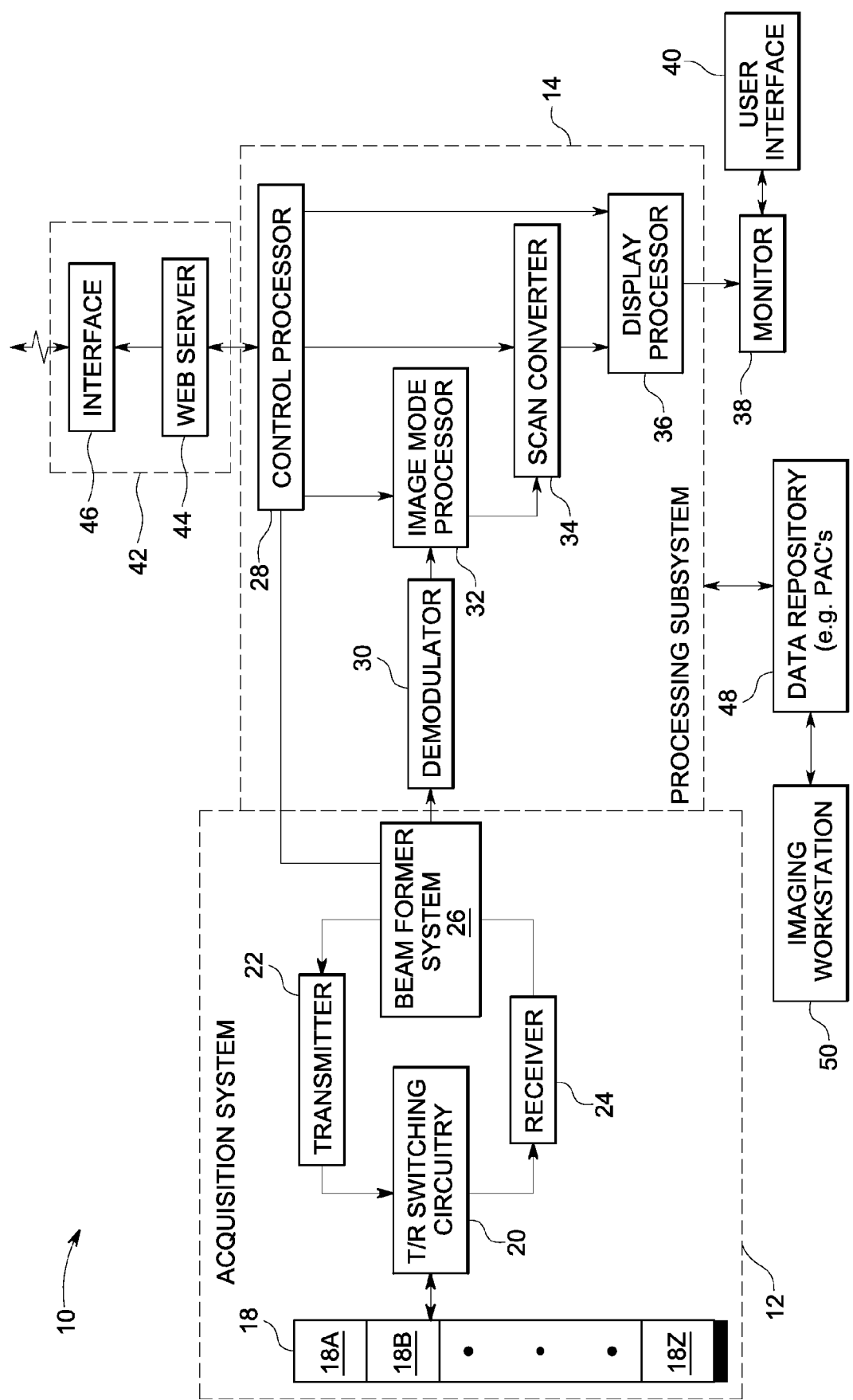
FIG. 1 is a block diagram of an exemplary embodiment of an ultrasound system to which embodiments of the present invention are applicable.

FIG. 1 is a block diagram of an embodiment of an exemplary ultrasound system 10 to which embodiments of the present invention are applicable. The ultrasound system comprises of acquisition subsystem 12 and processing subsystem 14. The acquisition subsystem 12 comprises a transducer array 18 (comprising a plurality of transducer array elements 18A through 18Z), transmit/receive switch 20, a transmitter 22, a receiver 24 together known as a transceiver, and a beamformer system 26. Processing subsystem 14 comprises a control processor 28, a demodulator 30, an imaging mode processor 32, a scan converter 34 and a display processor 36. The display processor 36 is further coupled to a monitor 38 for displaying images. User interface 40 interacts with display monitor 38, which in turn may interact with display processor 36. The processing subsystem 14 may also be coupled to a remote connectivity subsystem 42 comprising a web server 44 and a remote connectivity interface 46. Processing subsystem 14 may be further coupled to data repository 48 to receive ultrasound image data. The data repository interacts with image workstation 50.

As used herein, "operable to", "configured to" and the like refer to hardware or software connections between elements to allow the elements to cooperate to provide a described effect; these terms also refer to operation capabilities of electrical elements such as analog or digital computers or application specific devices (such as an application specific integrated circuit (ASIC)) that are programmed to perform a sequel to provide an output in response to given input signals.

The architectures and modules may be dedicated hardware elements such as circuit boards with digital signal processors or may be software running on a general purpose computer or processor such as a commercial, off-the-shelf PC. The various architectures and modules may be combined or separated according to various embodiments of the invention.

Referring further to FIG. 1, in the acquisition subsystem 12, the transducer array 18 would be in contact with an object or a subject (not shown) undergoing imaging. The transducer array 18 is coupled to the transmit/receive (T/R) switch 20. The T/R switch 20 is coupled to the output of transmitter 22 and the input of receiver 24. In a conventional ultrasound system, T/R switch 20 is synchronized with the transmitter 22 and isolates the high voltage used for transmitting from the sensitive amplification stages of the ultrasound system. Likewise, in a conventional ultrasound system, transmitter 22 provides the electrical voltage for exciting the transducer or transducer elements and the transmitter 22 controls the output transmit power by adjustment of the applied voltage. Continuing with FIG. 1, the output of receiver 24 is an input to beamformer 26. Beamformer 26 is further coupled to the input of transmitter 22, and to the input of demodulator 30.

In processing subsystem 14, the output of demodulator 30 is coupled to an input of imaging mode processor 32. Control processor interfaces to imaging mode processor 32, scan converter 34 and to display processor 36. An output of imaging mode processor 32 is coupled to an input of scan converter 34. An output of scan converter 34 is coupled to an input of display processor 36. The output of display processor 36 is coupled to monitor 38.

Ultrasound system 10 transmits ultrasound energy into selected regions of an object or subject (not shown) and receives and processes backscattered echo signals from the subject to create and display an image. To generate a transmitted beam of ultrasound energy, the control processor 28 sends command data to the beamformer 26 to generate transmit parameters to create a beam of a desired shape originating from a certain point at the surface of the transducer array 18 at a desired steering angle. The transmit parameters are sent from the beamformer 26 to the transmitter 22. The transmitter 22 uses the transmit parameters to properly encode transmit signals to be sent to the transducer array 18 through the T/R switch 20. The transmit signals are set at certain levels and time delays with respect to each other and are provided to individual transducer elements of the transducer array 18. The transmit signals excite the transducer elements to emit ultrasound waves with the same time delay and level relationships. As a result, a transmitted beam of ultrasound energy is formed in a subject within a scan plane along a scan line when the transducer array 18 is acoustically coupled to the subject by using, for example, ultrasound gel. The process is known as electronic scanning. It is to be noted that devices 20,22, and 24 are each depicted as a single device interacting with an array of transducers. In reality each transducer will have its own associated transceiver.

The transducer array 18 is a two-way transducer. When ultrasound waves are transmitted into a subject, the ultrasound waves are backscattered off the tissue and blood samples within the subject. The transducer array 18 receives the backscattered echo signals at different times, depending on the distance into the tissue from which they return and the angle with respect to the surface of the transducer array 18 at which they return. The transducer elements are responsive to the backscattered echo signals and convert the ultrasound energy from the backscattered echo signals into electrical signals.

The received or hereinafter "receive" electrical signals are routed through the T/R switch 20 to the receiver 24. The receiver 24 amplifies and digitizes the receive signals and provides other functions such as gain compensation. The digitized receive signals correspond to the backscattered waves received by each transducer element at various times and preserve the amplitude and arrival time information of the backscattered waves.

The digitized received signals are sent to beamformer system 26. The control processor 28 sends command data to beamformer system 26. Beamformer system 26 uses the command data to form a receive beam originating from a point on the surface of transducer array 18 at a steering angle typically corresponding to the steering angle of the previous ultrasound beam transmitted along a scan line.

The beamformer system 26 operates on the appropriate received signals by performing time delaying, amplitude weighting, and summing, according to the instructions of the command data from the control processor 28, to create received beam signals corresponding to sample volumes along a scan line in the scan plane within the subject.

The received beam signals are sent to processing subsystem 14. Demodulator 30 demodulates the received beam signals to create pairs of Q and I demodulated data values corresponding to sample volumes within the scan plane. The demodulated data is transferred to imaging mode processor 32 which is configured to generate an image. The image mode processor 32 uses parameter estimation techniques to generate imaging parameter values from the demodulated data in scan sequence format. The imaging parameters may comprise parameters corresponding to various possible imaging modes such as, for example, B-mode, M-mode, color velocity mode, spectral Doppler mode, and tissue velocity imaging mode. The imaging parameter values are passed to scan converter 34. Scan converter 34 processes the parameter data by performing a translation from scan sequence format to display format. The translation includes performing interpolation operations on the parameter data to create display pixel data in the display format.

The scan-converted pixel data is sent to display processor 36 to perform any final spatial or temporal filtering of the scan converted pixel data, to apply grayscale or color to the scan-converted pixel data, and to convert the digital pixel data to analog data for display on monitor 38. The user 40 interacts with the beamformer system 26 based on the data displayed on monitor 38. It is to be appreciated that the ultrasound system 10 described herein is for exemplary purposes and that other ultrasound systems may be employed.

For the purposes of this disclosure, "low voltage" means any voltage level that is readily implemented in widely available "standard" semiconductor processes. This could be anywhere from 2.5 to 5 V (for CMOS) up to 25 to 30 V (for BiCMOS). In contrast, "high voltage" means voltage levels that are only accessible if more specialized semiconductor processes and device structures are used (e.g., DMOSFETs, silicon on insulator (SOI), trench isolation, etc.) Therefore any voltage level from about 30 V up to as high as 500 V should be considered to be "high voltage".

In embodiments of the present invention, the transmit/receive switch 20 and transmitter 22 and corresponding functionalities of FIG. 1 are replaced by a transceiver that is configured to operate in transmit and receive modes and which will be described now in greater detail with reference to FIG. 2. Further, transceiver 20 is designed such that the ultrasound system 10 is operable at sufficiently high frequencies so as to provide good image quality for the intended application.

Figure 2A:
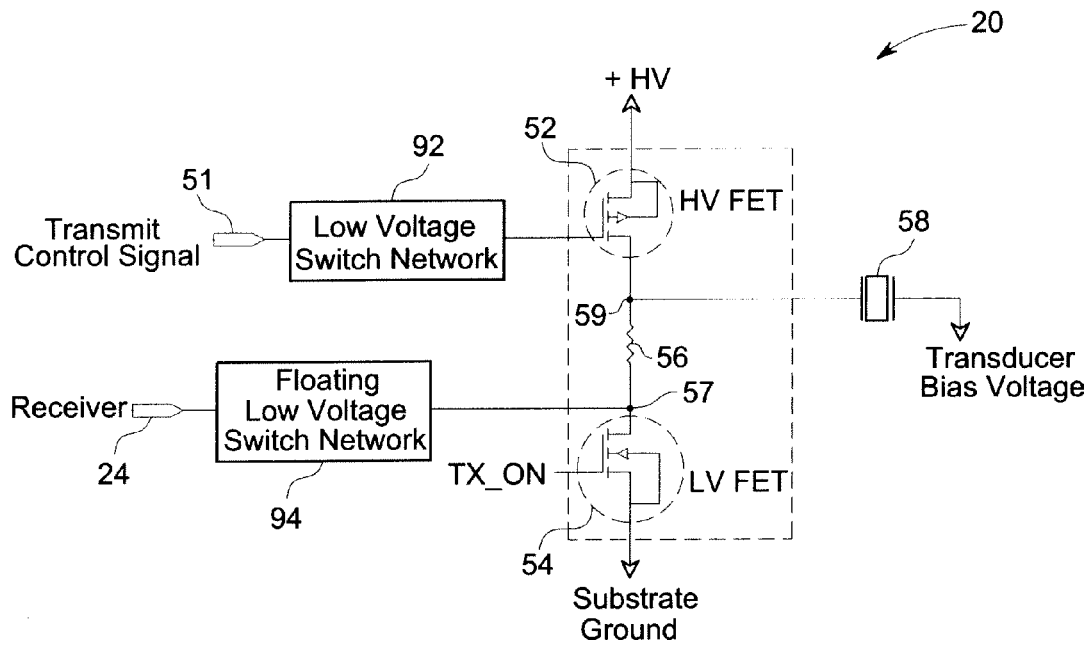
FIG. 2 is a circuit diagram illustrating one way in which transceiver is implemented according to one aspect of the invention
Figure 2B:
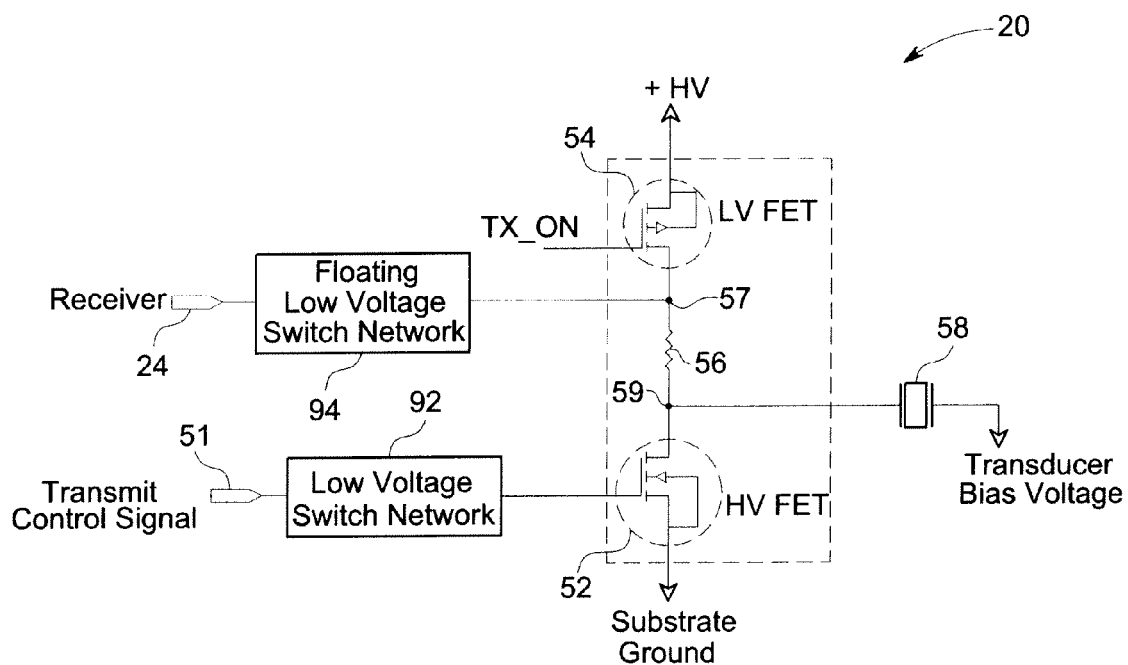

Referring now to FIG. 2, there is shown two circuit diagrams illustrating transceiver 20 according to aspects of the invention. FIG. 2a shows a first embodiment of transceiver 20 in which the receive signal from receiver 24 is at a low voltage relative to ground and whereas the transmit control signal 51 is at a high voltage relative to ground. FIG. 2b shows a second embodiment of transceiver 20 in which the opposite is true: the receive signal is at a high voltage relative to ground while the transmit control signal 51 is at a low voltage relative to ground.

In each embodiment shown in FIG. 2a and 2b, transceiver 20 comprises a high voltage switch 52, a low voltage switch 54 and a resistor 56. Transceiver 20 is configured to operate alternately in transmit and receive modes. High voltage switch and low voltage switch may comprise MOSFET devices.

Referring first to FIG. 2b, during a transmit phase, high voltage switch 52 is enabled and the output of transducer 58 is at ground. When the transmit control signal 51 is pulsed 'low', high voltage switch 52 is disabled and the transducer 58 charges through resistor 56 and low voltage switch 54 to high voltage ('HV'). Receiver 24 is biased at 'HV' and therefore has low relative voltage. High voltage switch 52 is then pulsed to return to ground again. During transmit mode, the low voltage transmit control signal 51 passes through the low voltage switching network 92 and reaches the input to the high voltage switch 52. When the transmit control signal 51 pulses high, it turns on high voltage switch 52 which pulls current out of the transducer 58 load capacitance and discharges transducer 58 towards ground. When the transmit control signal returns to being at a low value, high voltage switch 52 is turned off and the transducer load capacitance is brought up to the high voltage value through resistor 56 and low voltage switch 54.

Referring now to FIG. 2a, during a receive mode, high voltage switch 52 is disabled and low voltage switch 54 is set at a high impedance, which enables the receive node 57 to be weakly biased at 'GND'. The reflected echo signals or 'receive' signals from the transducer 58 passes through resistor 56 and to the receiver. In the receive mode, signals from the transducer are propagated through resistor 56 and then back to floating low voltage switching network 94.

It is to be appreciated that since the transceiver 20 requires only one high voltage switch, the overall area of the transceiver is substantially reduced. In one specific embodiment, the area of the transceiver may be a fourth of a size of a conventional transmit/receive switch used in ultrasound systems.

Additional further adaptations to the embodiments described are also contemplated. In an embodiment, transceiver 20 of FIG. 2 comprises a high voltage switch that is biased to be constantly on in place of the resistor 56. In another embodiment, the high voltage supply is reduced to ground during the receive phase to save power. In yet another embodiment, transceiver 20 may be operated as a multi-level transmitter by using multi-level transmit control signals.

In embodiments of the invention, the transceiver is configured to be coupled to at least one transducer in an ultrasound imaging system and the transducer is operable to receive and convert ultrasound signals during imaging into electrical signals. Further, in transmit mode the transceiver operates to transmit and control voltage to the transducer in the ultrasound system and, in receive mode, the transceiver operates as a transmit/receive (T/R) switch to isolate high voltage within an ultrasound system during the receive mode.

In one embodiment, the transceiver 20 is adapted for use in ultrasound systems with reconfigurable arrays. A reconfigurable ultrasound array is one that allows groups of subelements to be connected together dynamically so that a shape of the resulting element can be made to match the shape of the beam. Arrays can be reconfigured using switching networks. For purpose of illustration, the reconfigurable array is described with reference to capacitive micromachined ultrasound transducers (cMUTs). However, it should be understood that the aspects of the invention disclosed herein are not limited in their application to probes employing cMUTs. For example, another embodiment may employ Lead Zirconate Titanate (PZT) transducers.

Figure 3:
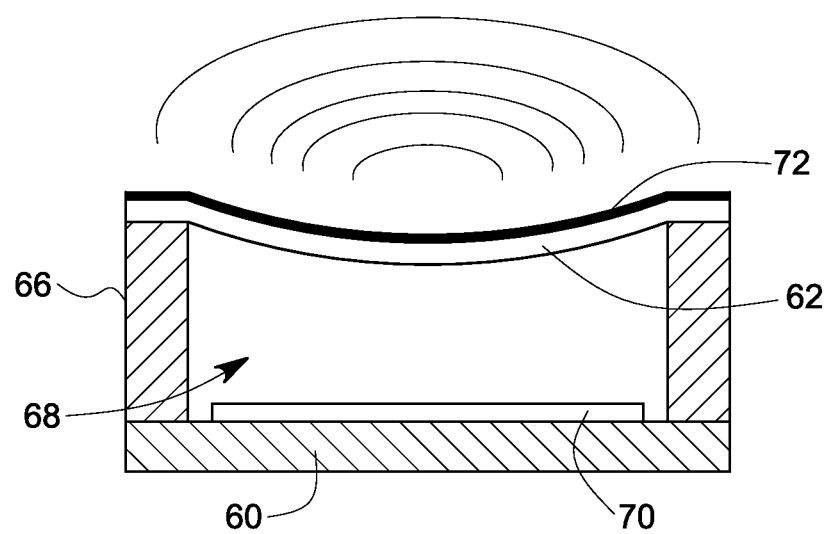
FIG. 3 is a cross sectional view of typical cMUT cell implemented according to one aspect of the invention.

FIG. 3 is a diagrammatic view of one embodiment of a cMUT transducer cell. An array of such cMUT transducer cells is typically fabricated on a substrate 60, such as a heavily doped silicon (hence, semiconductive) wafer. For each cMUT transducer cell, a thin membrane or diaphragm 62, which may be made of silicon nitride, is suspended above the substrate 60. The membrane 62 is supported on its periphery by an insulating support 66, which may be made of silicon oxide or silicon nitride. The cavity 68 between the membrane 62 and the substrate 60 may be air- or gas-filled or wholly or partially evacuated. Typically, cMUTs are evacuated as completely as the processes allow. A film or layer of conductive material, such as aluminum alloy or other suitable conductive material, forms an electrode 72 on the membrane 62, and another film or layer made of conductive material forms an electrode 70 on the substrate 60. Alternatively, the bottom electrode 70 can be formed by appropriate doping of the semiconductive substrate 60.

The two electrodes 70 and 72, separated by the cavity 68, form a capacitance. When an impinging acoustic signal causes the membrane 62 to vibrate, the variation in the capacitance can be detected using associated electronics (not shown in FIG. 3), thereby transducing the acoustic signal into an electrical signal. Conversely, an AC signal applied to one of the electrodes will modulate the charge on the electrode, which in turn causes a modulation in the capacitive force between the electrodes, the latter causing the diaphragm to move and thereby transmit an acoustic signal.

Typically, multiple cells are grouped together by connecting them electrically to create a larger subelement, which can have the individual control while maintaining the desired acoustical response. The subelements are connected together using a switching network. The elements can be reconfigured by changing the state of the switching network to interconnect different subelements to each other. However, individual sub-elements cannot be reconfigured to form different subelements. The manner in which the sub-elements are connected together using a switching network is described in further detail below.

Figure 4:
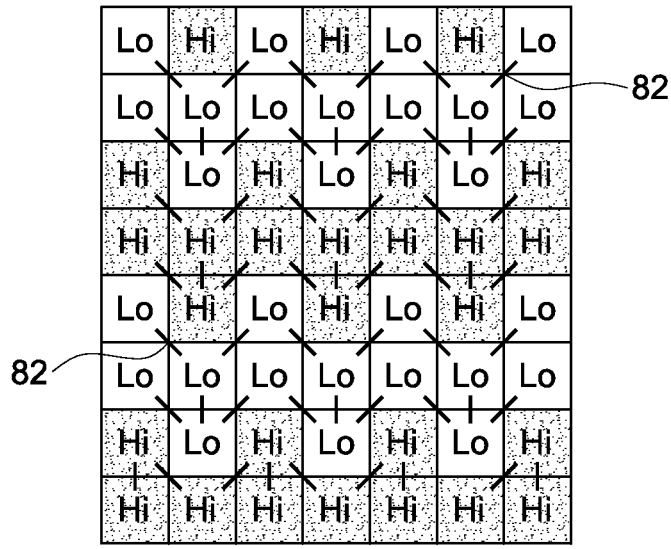
FIG. 4 is a block diagram of an embodiment of a cMUT array comprising multiple cells.
Figure 5:
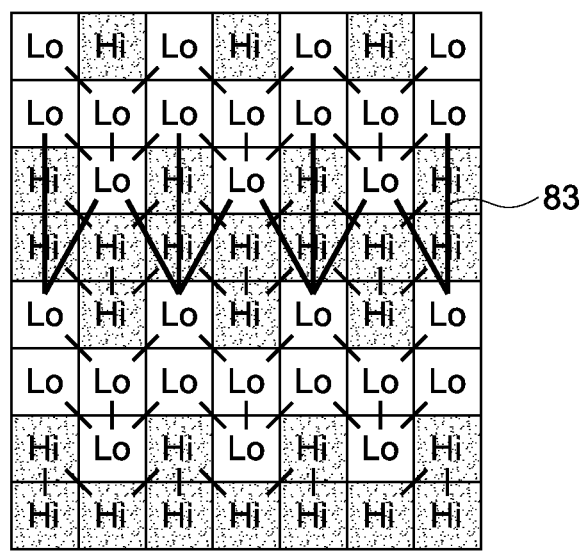
FIG. 5 is a block diagram of an alternative embodiment of a cMUT array comprising multiple cells.

FIG. 4 is a block diagram of an embodiment of a cMUT array comprising multiple cells. Each cell is labelled either 'Hi' or 'Lo' based on whether the cell uses high voltage P or high voltage N devices as in FIG. 2a or FIG. 2b respectively, wherein the embodiment as shown in FIG. 2a shall be referred to as a "Hi" cell and the embodiment as shown in FIG. 2b shall be referred to as a "Lo" cell. The 'Lo' cells are coupled together using switching network 82. Similarly, the 'Hi' cells are also coupled together using switching network 82. In a further embodiment, as shown in FIG. 5, 'Lo' cell islands are coupled to each other using extended switching paths 83 that pass through the high cells without making connections there.

Figure 6:
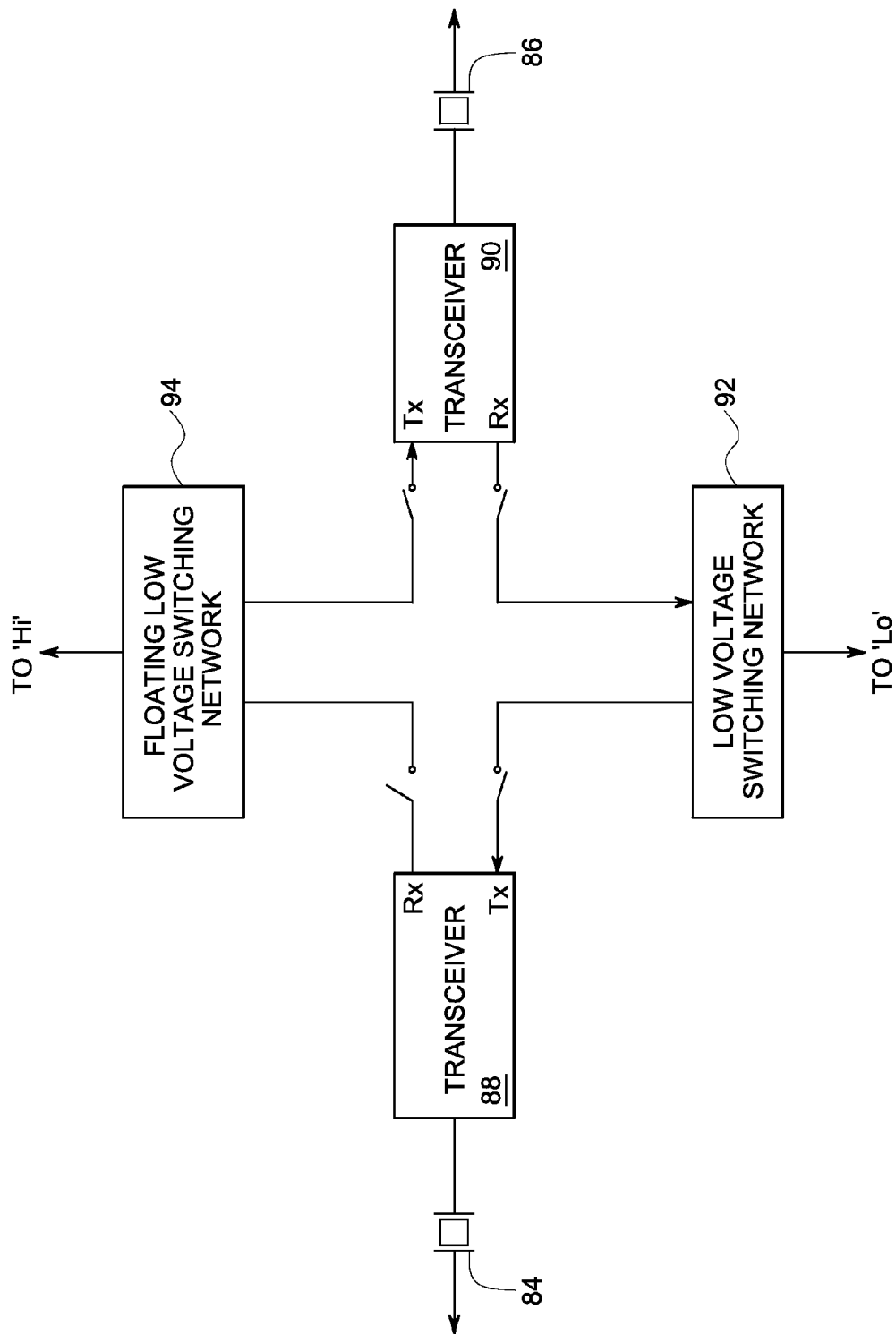
FIG. 6 is a circuit diagram of one embodiment of a switching network that may be shared to couple cells together.

FIG. 6 is a circuit diagram of one embodiment of a switching network that may be shared to couple cells together. Transceiver 88 is coupled to transducer 84 and Tranceiver 90 is coupled to transducer 86. The transceivers are also coupled to each other using low voltage switching network 92 and floating low voltage switching network 94. The floating low voltage switching network 94 is used to couple a 'Hi' cell to other 'Hi' cells in the cMUT array. Similarly low voltage switching network 92 is used to couple a 'Lo' cell to other 'Lo' cells in the cMUT array. In a further embodiment, the transducers and transceivers are arranged to form a bipolar transceiver circuit, in which each bipolar transceiver circuit comprises a single transducer, for example, 84 or 86, coupled to and driven on both sides by two transceivers such as transceivers 88 and 90.

Operation of the circuit shown in FIG. 6 is as follows: During transmit mode, all 'Hi' cells receive transmit control signals which are biased relative to the high voltage supply of the circuit. These signals are able to pass through the floating low voltage switch network 94 without damaging the low voltage switches. This allows the use of low voltage switches for the transmit control signals which are about 10×smaller than similarly functioning high voltage switches. At the same time, low voltage transmit control signals pass through the low voltage switching network 92 for the 'Lo' cells in the matrix.

The 'Lo' cells contain circuits as shown in FIG. 2b, whereas the 'Hi' cells contain circuits as shown in FIG. 2a. For illustrative purposes, operation of a 'Lo' cell is now described. With reference to FIGS. 2 and 6, the low voltage transmit control signal 51 passes through the low voltage switching network 92 and reaches the input to the high voltage switch 52. When the transmit control signal pulses high, it turns on high voltage switch 52 which pulls current out of the transducer load capacitance and discharges it towards ground. When the control signal returns to being at a low value, high voltage switch 52 is turned off and the transducer load capacitance is brought up to the high voltage value through resistor 56 and low voltage switch 54.

In the receive case, signals form the transducer are propagated through resistor 56 and then back to floating low voltage switching network 94. From there they propagate from 'Lo' cell to 'Lo' until they finally reach the output.

Similarly for the 'Hi' cell case, transmit control and receive signals are split up so that they each propagate through only the 'Hi' network or the 'Lo' network. This architecture makes it possible to use a very compact transceiver which has only a single high voltage switch in it as well as using low voltage switches for the switching network which also reduces the size of the circuit as a whole.

Further adaptations to the transceiver may be made to improve the quality of the signals. In a further embodiment, each transceiver may further comprise a receive amplifier coupled to a transceiver receive input wherein the receive amplifier buffers or amplifies the receive signal before the signal enters a receive switch network. In another further embodiment, each transceiver may further comprise a control signal decoder that is coupled to transmit control input of the transceiver and wherein the control signal decoder buffers and decodes the signal when the signal comes out of a transmit switch network.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A transducer array for use in ultrasound imaging, the transducer array comprising:
   a plurality of transducers;
   a plurality of transceivers, wherein each of the plurality of transducers is coupled to an associated transceiver, each of the plurality of transceivers comprising:
      a high voltage MOS device comprising a source, a gate and a drain, wherein the source of the high voltage MOS device is coupled to a high voltage supply, and wherein the gate of the high voltage MOS device is coupled to a floating low voltage switching network, wherein the floating low voltage switching network is biased relative to the high voltage supply;
      a low voltage MOS device comprising a source, a gate and a drain, wherein the source of the low voltage MOS device is coupled to a low voltage supply, and wherein the gate of the low voltage MOS device is coupled to a low voltage switching network, wherein the low voltage switching network is biased relative to the ground; and
      a resistor coupled between the high voltage MOS device and the low voltage MOS device, wherein the resistor is coupled to the drains of the high and low voltage MOS devices, and wherein the transceiver is configured to operate alternately in a transmit mode and in a receive mode.

2. The transducer array of claim 1, wherein each of the plurality of transducers is operable to receive and convert ultrasound signals during imaging into electrical signals.

3. The transducer array of claim 1, wherein in transmit mode each of the plurality of transceivers operates to transmit a voltage to a corresponding transducer in the ultrasound system.

4. The transducer array of claim 1, wherein in receive mode each of the plurality of transceivers operates as a transmit/receive (T/R) switch to isolate high voltage within an ultrasound system during the receive mode.

5. The transducer array of claim 2, wherein during receive mode, for each transceiver, a high voltage MOS device is disabled, a low voltage MOS device is enabled in high impedance mode and receive signals from the transducer pass through a corresponding resistor.

6. The transducer array of claim 2, wherein during transmit mode, for each transceiver, a high voltage MOS device enabled responsive to a high transmit control signal, the enabled high voltage MOS device pulls current from an associated transducer and discharges the transducer.

7. The transducer array of claim 1, wherein the high voltage MOS device comprises a MOSFET.

8. The transducer array of claim 1, wherein the low voltage MOS device comprises a MOSFET.

9. An ultrasound system for imaging objects, the ultrasound system comprising:
a probe for transmitting and receiving ultrasound signals, the probe comprising a transducer array comprising
a plurality of transducers;
a plurality of transceivers configured to operate alternately in a transmit mode and a receive mode; wherein each of the plurality of transducers is coupled to an associated transceiver, each transceiver comprising:
a high voltage MOS device comprising a source, a gate and a drain, wherein the source of the high voltage MOS device is coupled to a high voltage supply, and wherein the gate of the high voltage MOS device is coupled to a floating low voltage switching network, wherein the floating low voltage switching network is biased relative to the high voltage supply;
a low voltage MOS device comprising a source, a gate and a drain, wherein the source of the low voltage MOS device is coupled to a low voltage supply, and wherein the gate of the low voltage MOS device is coupled to a low voltage switching network, wherein the low voltage switching network is biased near ground;
a resistor coupled to the high voltage MOS device and the low voltage MOS device, wherein the resistor is coupled to the drains of the high and low voltage MOS devices; and
an image processor configured to generate an ultrasound image of the objects.

10. The ultrasound system of claim 9, wherein the transducers are operable to receive and convert ultrasound signals during imaging into electrical signals.

11. The ultrasound system of claim 9, wherein during transmit mode each of the transceivers operates to transmit a voltage to the transducers.

12. The ultrasound system of claim 9, wherein during receive mode the transceivers each operate as a transmit/receive (T/R) switch to isolate high voltage within the ultrasound system during the receive mode.

13. The ultrasound system of claim 9, wherein during receive mode, within each transceiver the high voltage MOS device is disabled, the low voltage MOS device is enabled in a high impedance mode and receive signals from each transducer pass through the resistor.

14. The ultrasound system of claim 9, during transmit mode, within each transceiver the high voltage MOS device is enabled responsive to a high transmit control signal, the enabled high voltage MOS device pulls current from each transducer and discharges the transducer.

15. The ultrasound system of claim 9, wherein the at least two transducers are disposed adjacent to each other.

16. The ultrasound system of claim 14, wherein the high voltage MOS device comprises a MOSFET.

17. The ultrasound system of claim 9, wherein the plurality of ultrasonic transducers comprises a reconfigurable transducer array.

18. The ultrasound system of claim 17, wherein the reconfigurable transducer array comprises an array of capacitive micromachined ultrasound transducer (cMUTs) cells or Lead Zirconate Titanate (PZT) transducers.

19. The ultrasound system of claim 18, wherein the cells may be coupled together using a low voltage switching network.

20. The ultrasound system of claim 9, wherein each transceiver further comprises a receive amplifier coupled to a transceiver receive input wherein the receive amplifier buffers or amplifies the receive signal before the signal enters a receive switch network.

21. The ultrasound system of claim 9, wherein each transceiver further comprises a control signal decoder that is coupled to transmit control input of the transceiver and wherein the control signal decoder buffers and decodes the signal when the signal comes out of a transmit switch network.

22. A capacitive micromachined ultrasound transducer (cMUT) array, comprising:
a plurality of high voltage cells each of which comprises a high voltage P device;
a plurality of low voltage cells each of which comprises a high voltage N device;
a first transceiver operatively coupled to a first transducer;
a second transceiver operatively coupled to a second transducer;
a low voltage switching network configured to couple the plurality of low voltage cells to each other; and
a floating low voltage switching network configured to couple the plurality of high voltage cells to each other, wherein the first and second transceivers are coupled to each other via the low voltage switching network and the floating low voltage low voltage switching network, wherein the high voltage P device comprises a source, a gate and a drain, and the source of the high voltage P device is coupled to a high voltage supply, and the gate of the high voltage P device is coupled to the floating low voltage switching network, and the floating low voltage switching network is biased relative to the high voltage supply;
wherein the high voltage N device comprises a source, a gate and a drain, and the source of the high voltage N device is coupled to a low voltage supply, and the gate of the high voltage N device is coupled to the low voltage switching network, and the low voltage switching network is biased relative to the ground; and
wherein a resistor is coupled between the high voltage P device and the high voltage N device, and the resistor is coupled to drains of the high voltage P and high voltage N devices, and wherein the transceiver is configured to operate alternately in a transmit mode and in a receive mode.

23. The ultrasound system of claim 22, wherein each transceiver further comprises a control signal decoder that is coupled to transmit control input of the transceiver and wherein the control signal decoder buffers and decodes the signal when the signal comes out of a transmit switch network.

* * * * *